United States Patent [19]
Suzuki et al.

[11] Patent Number: 6,110,595
[45] Date of Patent: Aug. 29, 2000

[54] ANTI-REFLECTIVE FILM

[75] Inventors: Yasuyuki Suzuki, Yashio; Takashi Sato, Soka; Masaharu Nishimoto, Koshigaya; Shinichi Yamamoto, Yashio, all of Japan

[73] Assignee: Somar Corporation, Tokyo, Japan

[21] Appl. No.: 09/046,648

[22] Filed: Mar. 24, 1998

[30] Foreign Application Priority Data

Mar. 27, 1997 [JP] Japan ................................. 9-075523

[51] Int. Cl.⁷ ....................................... B32B 5/16
[52] U.S. Cl. ..................... 428/423; 428/327; 428/332; 428/341; 428/500
[58] Field of Search ...................... 428/323, 327, 428/332, 337, 343, 341, 500; 396/661

[56] References Cited

U.S. PATENT DOCUMENTS

| | | | |
|---|---|---|---|
| 5,081,347 | 1/1992 | Matsumoto | 250/211 |
| 5,591,517 | 1/1997 | Takamiya et al. | 428/304.4 |
| 5,770,306 | 6/1998 | Suzuki et al. | 428/328 |
| 5,831,774 | 11/1998 | Toshima et al. | 359/707 |

FOREIGN PATENT DOCUMENTS

| | | |
|---|---|---|
| 62-11905 | 1/1987 | Japan . |
| 4-9802 | 1/1992 | Japan . |
| 4-40259 | 2/1992 | Japan . |
| 6-344487 | 12/1994 | Japan . |
| 7-92305 | 4/1995 | Japan . |
| 7-159603 | 6/1995 | Japan . |
| 7-168006 | 7/1995 | Japan . |

*Primary Examiner*—Bruce H. Hess
*Assistant Examiner*—Michael E. Grendzynski
*Attorney, Agent, or Firm*—Wenderoth, Lind & Ponack, L.L.P.

[57] ABSTRACT

Disclosed is a novel anti-reflective film used for reducing the adverse influences of stray light within an optical instrument such as photographic cameras by attaching onto the inner walls of the instrument. The anti-reflective film consists of a substrate film of a synthetic resin and an anti-reflective coating layer formed on one surface of the substrate film by coating with a coating composition comprising (a) a synthetic resin as a binder to form the matrix phase of the coating layer, (b) particles of a synthetic resin having an average particle diameter in the range from 15 to 50 $\mu$m dispersed in the matrix phase, and (c) particles of carbon having an average particle diameter not exceeding 2 $\mu$m dispersed in the matrix phase.

6 Claims, No Drawings

ANTI-REFLECTIVE FILM

BACKGROUND OF THE INVENTION

The present invention relates to a novel anti-reflective film useful for reducing stray light in various kinds of optical instruments or, more particularly, to an anti-reflective film which is attached to the inner wall of a photographic camera or other optical instruments with an object to decrease stray light arriving at the photographic film or photodetector means due to low-angle incident light through the camera lens.

As is known, optical instruments in general, such as photographic cameras, copying machines, developing machines and the like, have a problem of drawbacks due to the stray light by the irregular reflection of the incident light on the inner walls of the instrument. In a photographic camera, for example, the low-angle incident light through the lens is irregularly reflected on the inner surface of the camera and reaches the photographic film to cause undue sensitization of the film or to enter the optical path of the range finder decreasing the visibility of the view field images. Many of modern cameras are designed to be equipped with a zoom lens having variable focal lengths, in which an undesirable phenomenon of halation or ghost images appearing on the photograph as a result of irregular reflection of the low-angle incident light on the inner surface of the lens tube or on the surface of the flexible printed circuit board installed for driving the zoom lens or other systems of the camera resulting in intermixing of the stray light with the imaging light through the lens. In a copying machine, the photoimages formed in the photosensitive body is subject to a decrease in the sharpness and contrast due to the light produced inside the machine and reaching the surface of the photosensitive body as reflected on the inner walls of the machine. In a developing machine of photographic films as exposed, stray light formed by the reflection of leak light into the machine causes sensitization of the film under development or reaches the photographic paper under development resulting in a decrease in the contrast of the photograph as developed.

It is a conventional measure with an object to solve this problem that an optical instrument or, in particular, photographic camera is so designed that the camera body, shutter case, cover and the like are shaped from a black-colored plastic resin and imparted with a matted surface or, alternatively, a black flocked paper sheet is adhesively bonded to the surface of the printed circuit board built in the camera and inner walls of the optical instrument.

The above mentioned former method of forming the inside wall of an optical instrument from a black-colored plastic resin with a matting treatment of the surface is industrially and technically not practicable because the adverse effects of stray light due to irregular reflection can hardly be estimated with sufficient reliability at the stage of instrument designing so that the treatment of the surface on a particularly limited area can hardly be undertaken selectively unless a great increase in the manufacturing costs of the instruments is disregarded. What is worse in this method is that the anti-reflective effect obtained therewith cannot be high enough to the light incident at a low angle. The method employing a black-colored flocked paper sheet has disadvantages that the effective inside volume of the camera body and the like is necessarily decreased as a result of attaching the flocked paper sheet having a relatively large thickness on the inner surface of the camera body and that the flocks of the flocked paper sheet sometimes fall off the paper sheet to cause serious dustiness if not to mention the problem of susceptibility of the flocked paper sheet to deposition of dust particles thereon from ambience.

Along with the trend in recent years toward more and more compactness of photographic cameras and the like, various parts of the instrument are also required to be more compact so that the anti-reflective sheet to be attached to the inner surface of the instrument is also required to have a high anti-reflective effect with a thickness as small as possible and to be free from the problem of occurrence of dusts.

SUMMARY OF THE INVENTION

The present invention accordingly has an object to provide a novel and improved anti-reflective film having a small thickness to be suitable for attaching to the inner surface of optical instruments such as photographic cameras and to exhibit a high anti-reflective effect as well as safety against occurrence of dust particles therefrom even when the anti-reflective film is prolongedly kept attached to the inner surface of the optical instrument.

Thus, the anti-reflective film provided by the present invention is a laminated sheet which comprises:

(A) a substrate film; and
(B) an anti-reflective coating layer having a thickness in the range from 15 to 100 $\mu$m and formed on one of the surfaces of the substrate film from a coating composition comprising
  (a) a synthetic resin as a binder to form the matrix phase of the coating layer,
  (b) particles of a synthetic resin having an average particle diameter in the range from 15 to 50 $\mu$m dispersed in the matrix phase, and
  (c) particles of carbon having an average particle diameter not exceeding 2 $\mu$m dispersed in the matrix phase, the surface of the anti-reflective coating layer having a surface roughness as expressed by the center line average height Ra in the range from 4 to 8 $\mu$m and having a reflection density of at least 1.60.

It is preferable in the above defined anti-reflective film of the invention that the substrate film is a black-colored light-shielding plastic resin film and the particles of the synthetic resin as an ingredient of the coating composition for the anti-reflective coating layer are colored in black.

It is optional that the surface of the substrate film opposite to the surface on which the anti-reflective coating layer is provided is coated with a pressure-sensitive adhesive to facilitate adhesive bonding of the anti-reflective film onto the inner wall of an optical instrument. The pressure-sensitive adhesive layer is usually protected until adhesive bonding of the anti-reflective film by attaching a releasable sheet thereto.

The present invention further provides an improved photographic camera having the above defined anti-reflective film adhesively bonded to at least a part of the inner surface of the camera body with the anti-reflective coating layer facing inwardly.

DETAILED DESCRIPTION OF THE PREFERRED EMBODIMENTS

As is described above, the anti-reflective film of the invention basically consists of a substrate film and an anti-reflective coating layer formed on one of the surfaces of the substrate film. The material of the substrate film, which can be transparent, translucent or opaque, is not particularly limitative but is usually selected from polyolefin resins such as polyethylene, polypropylene, copolymers of ethylene and propylene and copolymers of ethylene and an α-olefin monomer having at least 4 carbon atoms in a molecule, polyester resins such as poly(ethylene terephthalate), polyamide resins such as nylon and other general-purpose plastic resins such as poly(vinyl chloride), poly(vinyl acetate) and copolymers of ethylene and vinyl acetate. It is advantageous that the resin for shaping the substrate film is compounded with a black pigment or dye such as carbon black and aniline black in such an amount that the substrate film shaped from the resin composition may have an optical density of at least 7.0 to exhibit high light-absorptivity so that the anti-reflective effect obtained with the inventive anti-reflective film is further enhanced.

It is preferable that the surface of the substrate film is, prior to formation of the anti-reflective coating layer thereon, imparted with matteness by a matting treatment which can be performed by any conventional methods for matting of a plastic resin film such as the sand blasting method, corona discharge method and chemical matting method by the use of a synthetic resin and a surface-roughening agent.

The thickness of the substrate film naturally depends on the particularly intended application of the anti-reflective film but is selected usually in the range from 25 to 200 μm. When the thickness is too small, no sufficiently high anti-reflective effect could not be obtained while, when the thickness of the substrate film is too large, the effective inside volume of the optical instrument is decreased by the volume occupied by the anti-reflective film attached to the inner walls thereof not to meet the requirement for compactness of the instrument.

It is sometimes advantageous that the surface of the substrate film, on which the anti-reflective coating layer is formed, is provided, prior to coating with an anti-reflective coating composition, with an anchoring layer in an object to improve adhesion of the anti-reflective coating layer to the substrate film. The anchoring layer is formed usually from a urea resin, melamine resin or urethane resin. An anchoring layer of a urethane resin can be formed by coating the substrate surface with a coating solution containing a polyisocyanate compound and a compound having two or more active hydrogen atoms in the molecule such as diamine compounds and diol compounds followed by curing of the coating layer. Anchoring layers of a urea resin or melamine resin can be formed by coating the substrate surface with a coating solution containing a water-soluble urea resin or a water-soluble melamine resin followed by curing of the coating layer. The coating amount with these anchoring resins is in the range from 0.1 to 2.0 g/m².

The anti-reflective coating layer of the inventive anti-reflective film, which consists of a synthetic resin as a binder, fine particles of a synthetic resin and particles of carbon, is formed directly on the surface of the substrate film or on the above mentioned anchoring layer by coating with an anti-reflective coating composition comprising a liquid medium, a synthetic resin as a binder dissolved or dispersed in the liquid medium, particles of a synthetic resin and particles of carbon.

The synthetic resin as a binder to form the matrix phase of the anti-reflective coating layer, which can be either a thermoplastic resin or a thermosetting resin, is required to have good heat resistance, high moisture resistance and excellent solvent resistance as well as a high surface hardness. In this regard, thermosetting resins are preferred to thermoplastic resins. Examples of suitable thermoplastic resins include polymers of a (meth)acrylic acid ester, poly (vinyl chloride) resin, polybutyral resins and copolymeric resins of styrene and butadiene. Examples of suitable thermosetting resins include curable acrylic resins, urethane resins, phenolic resins, melamine resins, urea resins, diallylphthalate resins, unsaturated polyester resins, epoxy resins and alkyd resins.

If necessary, the above mentioned binder resin is used in combination with a crosslinking agent which is selected from urea compounds, melamine compounds, isocyanate compounds, aziridine compounds and oxazoline compounds having functional groups in the molecule, of which melamine compounds having functional groups are preferred in respect of high heat resistance, solvent resistance and surface hardness imparted to the anti-reflective coating layer after curing of the coating layer. The amount of the crosslinking agent, when used, in the anti-reflective coating composition is usually in the range from 10 to 50% by weight based on the amount of the binder resin. When the amount of the crosslinking agent is too small, no full promoting effect on the curing reaction of the coating layer can be obtained while, when the amount thereof is too large, the cured coating layer would have brittleness due to an excessively high crosslinking density.

When a crosslinking agent as described above is used in combination with the binder resin, the crosslinking reaction by the crosslinking agent can be further promoted by admixing the coating composition with a crosslinking catalyst such as ammonia and ammonium chloride in an amount in the range from 0.1 to 10% by weight based on the amount of the crosslinking agent.

The anti-reflective coating layer in the inventive anti-reflective film contains fine particles of a synthetic resin as dispersed in the matrix phase formed from the above described binder resin. The surface roughness of the anti-reflective coating layer is controlled mainly by the synthetic resin particle incorporated hereinto. The synthetic resin for the fine particles is exemplified by melamine resins, benzoguanamine resins, polycondensation resins of benzoguanamine and melamine with formaldehyde, acrylic resins, urethane resins and styrene resins. These resins can be used either singly or as a combination of two kinds or more according to need. Since the object of incorporation of the synthetic resin particles in the anti-reflective coating layer is to prevent regular reflection of the incident light on the surface and to promote irregular reflection thereof, the synthetic resin particles should have an average particle diameter in the range from 15 to 50 μm or, preferably, in the range from 15 to 30 μm. When the efficiency of preventing reflection of light incident at a low angle and high angle, it is advantageous that a combination of acrylic resin particles and urethane resin particles is used as the synthetic resin particles. The particle configuration of the synthetic resin particles is not particularly limitative but it is preferable that the synthetic resin particles have a spherical configuration in respect of the good flowability of the liquid coating composition containing the same and coating workability of the coating composition as well as high reflection-preventing effect against low-angle incident light. It is optional that the synthetic resin particles are colored in black by compounding the resin with an organic or inorganic coloring agent.

The amount of the synthetic resin particles in the anti-reflective coating layer is in the range from 20 to 750% by weight or, preferably, from 50 to 500% by weight based on the amount of the binder resin and is selected by taking into account the surface roughness of the anti-reflective coating layer.

The anti-reflective coating layer of the inventive anti-reflective film contains fine carbon particles which should have an average particle diameter not exceeding 2 μm or, preferably, not exceeding 1 μm or, more preferably, not exceeding 0.5 μm. When the carbon particles are too coarse, controllability of the surface roughness of the anti-reflective coating layer by means of the synthetic resin particles is affected resulting in a decrease in the reflection-preventing effect of the anti-reflective film.

The amount of the carbon particles in the anti-reflective coating layer is in the range from 1 to 50% by weight or, preferably, from 5 to 30% by weight based on the amount of the binder resin. Though dependent on the particle size of the particles and thickness of the anti-reflective coating layer, the total amount of the synthetic resin particles and carbon particles is selected in the range from 20 to 800 parts by weight or, preferably, in the range from 50 to 500 parts by weight per 100 parts by weight of the binder resin. When the total amount of these particulate ingredients is too small, the anti-reflective effect of the anti-reflective film as desired cannot be obtained while, when the amount thereof is too large, the adhesive bonding strength of the anti-reflective coating layer to the substrate surface is adversely affected along with appearance of brittleness in the anti-reflective coating layer leading to eventual falling of the coating layer off the substrate surface.

As to the relative amounts of the synthetic resin particles and the carbon particles, the weight proportion of the former particles to the latter particles is selected in the range from 50:1 to 1:5 or, preferably, in the range from 20:1 to 1:2.

It is of course optional that the liquid coating composition containing the above described essential ingredients for the formation of the anti-reflective coating layer of the inventive anti-reflective film is compounded, according to need, with various kinds of known additives such as thickening agents, dispersing agents, coloring agents and defoaming agents each in a limited amount. A water-soluble acrylic resin is one of preferable additive agents because the resin has an excellent effect of thickening and dispersing to the liquid coating composition. The amount of such a water-soluble acrylic resin is in the range from 0.5 to 5% by weight based on the total amount of the binder resin, synthetic resin particles and carbon particles. When the amount thereof is too small, the above mentioned improvement cannot be obtained as a matter of course while, when the amount thereof is too large, the viscosity of the coating composition is unduly increased so that the workability in coating is adversely affected.

Though optional, it is advantageous that the substrate film is coated on the surface opposite to the anti-reflective coating layer with a pressure-sensitive adhesive so as to facilitate adhesive bonding of the anti-reflective film to the inner wall of an optical instrument. The coating amount of the pressure-sensitive adhesive on the substrate film is in the range from 10 to 25 g/m² or, preferably, in the range from 12 to 20 g/m². The pressure-sensitive adhesive layer is protected by attaching a releasable paper sheet, which is removed by peeling immediately before attaching the anti-reflective film to the optical instrument.

Examples of the pressure-sensitive adhesive to form the pressure-sensitive adhesive layer on the substrate film include those formulated with, for example, a mixture of natural rubber, a styrene-butadiene copolymeric rubber, copolymer of butadiene or isoprene and styrene, vinyl ether copolymer or silicone rubber as the base ingredient with admixture of a rosin-based, petroleum-based or terpenic tackifier, adhesiveness modifier, adhesion improver, aging retardar, stabilizer, coloring agent and the like. A preferred pressure-sensitive adhesive is that formulated with an acrylic acid ester-based resin as the principal base ingredient. The pressure-sensitive adhesive is preferably colored in black or in a dark color so as to prevent reflection of the light laterally incident on the end surface of the pressure-sensitive adhesive layer.

In the following, Examples are given to illustrate the anti-reflective film of the invention in more detail, in which the term of "parts" always refers to "parts by weight". The anti-reflective films prepared in the Examples were evaluated for the following items by the respective testing procedures described there.

(1) Surface roughness of the anti-reflective coating layer

Determination was performed for the center line average height Ra according to the procedure specified in JIS B0601.

(2) Reflection density of the anti-reflective coating layer

Measurement was made by using a digital reflection densitometer (Model RD-918, manufactured by Macbeth Co.).

(3) Surface glossiness of anti-reflective coating layer

The mirror-surface glossiness was determined according to JIS Z8741 at incidence angles of light of 60°, 75° and 85°.

(4) Flexibility of anti-reflective coating layer

Bending test was undertaken according to the procedure specified in JIS P7115 by using an MIT tester to record the number of repeated bending until break of the coating layer as a measure of the durability of the coating layer. The flexibility test was undertaken both (a) in the length-wise direction of the rolled substrate film and (b) in the direction across the rolled substrate film.

(5) Hardness of anti-reflective coating layer

Pencil hardness test was undertaken according to the procedure specified in JIS K5400.

EXAMPLE 1

A poly(ethylene terephthalate) film having a thickness of 50 μm as a substrate film was coated on one surface with a urethane resin-based coating composition in a coating amount of 7 g/m² as dried to form an anchoring layer.

Separately, a liquid coating composition for anti-reflective coating layer was prepared by uniformly blending 16.4 parts of a heat-curable acrylic resin emulsion containing 43% by weight, i.e. 7.1 parts, of non-volatile matter (Movinyl 747, a product by Hoechst Synthesis Co.), 9.1 parts of an aqueous dispersion containing 12% by weight, i.e. 1.1 parts, of carbon particles having an average particle diameter not exceeding 1 μm (GP Black #4613, a product by Mikuni Shikiso Co.), 15.0 parts of acrylic resin particles having a weight-average particle diameter of 20 μm (Techpolymer MBX-20 Black, a product by Sekisui Kaseihin Kogyo Co.), 6.3 parts of urethane resin particles having a weight-average particle diameter of 20 μm (Bernoc CFB-600C, a product by Dai-Nippon Ink Chemical Co.), 3.0 parts of an aqueous solution of a water-soluble acrylic resin containing 20%, i.e. 0.6 part, of the resin (Durimer AC-10H, a product by Nippon Junyaku Co.), 3.8 parts of a melamine resin containing 80%, i.e. 3.0 parts, of non-volatile matter (Sumitech Resin M-3, a product by Sumitomo Chemical Co.) as a crosslinking agent, 4.0 parts of a 5% ammonia water, 0.8 part of a 20% aqueous solution of ammonium chloride, 8.3 parts of ethyl alcohol and 33.3 parts of water.

The substrate film was coated on the anchoring layer of the urethane resin with the thus prepared coating composition followed by drying to form an anti-reflective coating layer having a thickness of 41 µm. The thus obtained anti-reflective film having an overall thickness of 91 µm was subjected to the evaluation tests to give the results shown in the Table below.

EXAMPLE 2

The experimental procedure was substantially the same as in Example 1 except that the anti-reflective coating composition was prepared from 16.4 parts of the same heat-curable acrylic resin emulsion containing 7.1 parts of non-volatile matter, 17.5 parts of the same aqueous dispersion containing 2.1 parts of carbon particles, 5.3 parts of the same acrylic resin particles, 2.2 parts of the same urethane resin particles, 3.0 parts of the same aqueous solution of a water-soluble acrylic resin containing 0.6 part of the resin, 3.8 parts of the same melamine resin containing 3.0 parts of non-volatile matter, 4.0 parts of a 5% ammonia water, 0.8 part of a 20% aqueous solution of ammonium chloride, 8.3 parts of ethyl alcohol and 33.3 parts of water.

The anti-reflective coating layer formed from this coating composition had a thickness of 35 µm instead of 41 µm.

The results of the evaluation tests of this anti-reflective film are shown in the Table below.

EXAMPLE 3

The experimental procedure was substantially the same as in Example 1 except that the anti-reflective coating composition was prepared from 16.4 parts of the same heat-curable acrylic resin emulsion containing 7.1 parts of non-volatile matter, 9.1 parts of the same aqueous dispersion containing 1.1 parts of carbon particles, 37.5 parts of the same acrylic resin particles, 15.8 parts of the same urethane resin particles, 3.0 parts of the same aqueous solution of a water-soluble acrylic resin containing 0.6 part of the resin, 3.8 parts of the same melamine resin containing 3.0 parts of non-volatile matter, 4.0 parts of a 5% ammonia water, 0.8 part of a 20% aqueous solution of ammonium chloride, 8.3 parts of ethyl alcohol and 33.3 parts of water.

The anti-reflective coating layer formed from this coating composition had a thickness of 50 µm instead of 41 µm.

The results of the evaluation tests of this anti-reflective film are shown in the Table below.

Comparative Example 1

The experimental procedure was substantially the same as in Example 1 except that the anti-reflective coating composition was prepared from 16.4 parts of the same heat-curable acrylic resin emulsion containing 7.1 parts of non-volatile matter, 9.1 parts of the same aqueous dispersion containing 1.1 parts of carbon particles, 21.3 parts of acrylic resin particles having an average particle diameter of 10 µm instead of 20 µm, 3.0 parts of the same aqueous solution of a water-soluble acrylic resin containing 0.6 part of the resin, 3.8 parts of the same melamine resin containing 3.0 parts of non-volatile matter, 4.0 parts of a 5% ammonia water, 0.8 part of a 20% aqueous solution of ammonium chloride, 8.3 parts of ethyl alcohol and 33.3 parts of water with omission of the urethane resin particles.

The anti-reflective coating layer formed from this coating composition had a thickness of 25 µm instead of 41 µm.

The results of the evaluation tests of this anti-reflective film are shown in the Table below.

Comparative Example 2

The experimental procedure was substantially the same as in Example 1 except that the anti-reflective coating composition was prepared from 16.4 parts of the same heat-curable acrylic resin emulsion containing 7.1 parts of non-volatile matter, 9.1 parts of the same aqueous dispersion containing 1.1 parts of carbon particles, 0.8 part of the same acrylic resin particles, 0.3 part of the same urethane resin particles, 3.0 parts of the same aqueous solution of a water-soluble acrylic resin containing 0.6 part of the resin, 3.8 parts of the same melamine resin containing 3.0 parts of non-volatile matter, 4.0 parts of a 5% ammonia water, 0.8 part of a 20% aqueous solution of ammonium chloride, 8.3 parts of ethyl alcohol and 33.3 parts of water.

The anti-reflective coating layer formed from this coating composition had a thickness of 37 µm instead of 41 µm.

The results of the evaluation tests of this anti-reflective film are shown in the Table below.

Comparative Example 3

The experimental procedure was substantially the same as in Example 1 except that the anti-reflective coating composition was prepared from 16.4 parts of the same heat-curable acrylic resin emulsion containing 7.1 parts of non-volatile matter, 12.4 parts of the same aqueous dispersion containing 1.5 parts of carbon particles, 52.5 parts of the same acrylic resin particles, 22.1 parts of the same urethane resin particles, 3.0 parts of the same aqueous solution of a water-soluble acrylic resin containing 0.6 part of the resin, 3.8 parts of the same melamine resin containing 3.0 parts of non-volatile matter, 4.0 parts of a 5% ammonia water, 0.8 part of a 20% aqueous solution of ammonium chloride, 8.3 parts of ethyl alcohol and
33.3 parts of water.

The anti-reflective coating layer formed from this coating composition had a thickness of 53 μm instead of 41 μm.

The results of the evaluation tests of this anti-reflective film are shown in the Table below.

TABLE

|  |  | Example | | | Comparative Example | | |
|---|---|---|---|---|---|---|---|
|  |  | 1 | 2 | 3 | 1 | 2 | 3 |
| Surface roughness, Ra, μm | | 5.20 | 4.80 | 5.11 | 3.20 | 3.15 | 4.20 |
| Reflection density | | 1.60 | 1.71 | 1.68 | 1.52 | 1.68 | 1.58 |
| Surface glossiness, % | 60° | 0.2 | 0.2 | 0.2 | 0.7 | 0.2 | 0.3 |
|  | 75° | 0.5 | 0.4 | 0.4 | 1.2 | 1.0 | 0.9 |
|  | 85° | 0.5 | 0.4 | 0.4 | 1.2 | 1.0 | 0.8 |
| Flexibility, times, × 10$^5$ | (a) | 1.9 | 2.0 | 1.8 | 1.9 | 1.7 | 1.8 |
|  | (b) | 2.8 | 2.9 | 2.8 | 2.8 | 2.6 | 2.8 |
| Hardness | | 3H | 4H | 3H | 3H | 4H | 2H |

As is understood from the results shown in the Table, the anti-reflective films prepared in the Comparative Examples were inferior as compared with those prepared in the Examples because the surface glossiness was higher irrespective of the incident angle of light or higher at a low incident angle of light even though lower at a high incident angle of light.

What is claimed is:

1. An anti-reflective film which is a laminated sheet comprising:
   (A) a substrate film;
   (B) an anti-reflective coating layer comprising a matrix phase having a thickness in the range from 15 to 100 μm formed on one of the surfaces of the substrate film from a composition which comprises
   (a) a synthetic resin as a binder to form the matrix phase of the coating layer,
   (b) particles of a synthetic resin having an average particle diameter in the range from 15 to 50 μm dispersed in the matrix phase, said particles being colored black, and
   (c) particles of carbon having an average particle diameter not exceeding 2 μm dispersed in the matrix phase, the total amount of the components (b) and (c) being in the range from 20 to 800 parts by weight per 100 parts by weight of the component (a) with a ratio of the amounts of the component (b) to the component (c) in the range from 50:1 to 1:5 by weight and the surface of the anti-reflective coating layer having a surface roughness as expressed by the center line average height Ra in the range from 4 to 8 μm and having a reflection density of at least 1.60.

2. The anti-reflective film as claimed in claim 1 in which the substrate film is a black-colored film.

3. The anti-reflective film as claimed in claim 1 which further comprises an anchoring layer in a coating amount in the range from 0.1 to 2.0 g/m$^2$ intervening between the substrate film and the anti-reflective coating layer.

4. The anti-reflective film as claimed in claim 1 in which the synthetic resin as a binder is an acrylic resin.

5. The anti-reflective film as claimed in claim 1 in which the substrate film has a thickness in the range from 25 to 200 μm.

6. A photographic camera having an anti-reflective film according to claim 1 adhesively bonded to at least a part of the inner surface of the camera body with the anti-reflective coating layer facing inwardly.

* * * * *